US010827052B1

(12) United States Patent
Han

(10) Patent No.: US 10,827,052 B1
(45) Date of Patent: Nov. 3, 2020

(54) MOBILE TERMINAL, METHOD AND APPARATUS FOR CONTROLLING SCREEN, AND STORAGE MEDIUM

(71) Applicant: BEIJING XIAOMI MOBILE SOFTWARE CO., LTD., Beijing (CN)

(72) Inventor: Gaocai Han, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 16/580,314

(22) Filed: Sep. 24, 2019

(30) Foreign Application Priority Data

Apr. 19, 2019 (CN) .......................... 2019 1 0319366

(51) Int. Cl.
*H04M 1/02* (2006.01)
*H04B 1/03* (2006.01)
*H04B 1/08* (2006.01)

(52) U.S. Cl.
CPC ....... *H04M 1/0268* (2013.01); *H04M 1/0218* (2013.01); *H04M 1/0241* (2013.01)

(58) Field of Classification Search
CPC ............. H04M 1/0268; H04M 1/0266; H04M 1/0218; H04M 1/0241; H04M 1/02; H04M 1/03; H04M 1/0295; H04B 1/03; H04B 1/08
See application file for complete search history.

(56) References Cited

U.S. PATENT DOCUMENTS

| | | | | |
|---|---|---|---|---|
| 9,258,396 B2 * | 2/2016 | Hwang | G06F 1/1677 | |
| 2003/0160892 A1 * | 8/2003 | Tamura | H04N 5/2251 | 348/333.07 |
| 2012/0168009 A1 * | 7/2012 | Chen | G09F 9/301 | 137/560 |
| 2013/0058063 A1 | 3/2013 | O'Brien et al. | | |
| 2013/0252668 A1 * | 9/2013 | Cheng | G06F 1/1647 | 455/556.1 |
| 2014/0194165 A1 * | 7/2014 | Hwang | G06F 1/1677 | 455/566 |
| 2015/0373863 A1 * | 12/2015 | Lin | A45C 11/00 | 206/774 |
| 2016/0100478 A1 | 4/2016 | Lee | | |

(Continued)

FOREIGN PATENT DOCUMENTS

| | | |
|---|---|---|
| CN | 108924296 A | 11/2018 |
| CN | 108932908 A | 12/2018 |

(Continued)

OTHER PUBLICATIONS

Extended European search report of counterpart EP application No. 19206108.3 dated Jan. 7, 2020.

*Primary Examiner* — Andrew Wendell
(74) *Attorney, Agent, or Firm* — Syncoda LLC; Feng Ma

(57) ABSTRACT

A mobile terminal includes a display screen, a support frame, a first side housing, a first reel, and a first driving assembly. The display screen is arranged on the support frame, and a first side portion of the display screen is made of a flexible material. The first reel is arranged in a cavity in the first side housing, and the first side portion of the display screen circumferentially surrounds about the first reel. The first driving assembly is connected to the first side housing through a first telescopic component.

18 Claims, 6 Drawing Sheets

(56) References Cited

U.S. PATENT DOCUMENTS

| | | | | |
|---|---|---|---|---|
| 2016/0165717 | A1* | 6/2016 | Lee | G09F 9/301<br>361/749 |
| 2017/0344073 | A1* | 11/2017 | Kang | G09F 9/301 |
| 2017/0357287 | A1* | 12/2017 | Yang | G06F 1/1677 |
| 2019/0235578 | A1* | 8/2019 | Zhang | G06F 1/1652 |
| 2019/0297736 | A1* | 9/2019 | Xu | H05K 1/028 |
| 2020/0022269 | A1* | 1/2020 | Liao | H05K 5/0221 |

FOREIGN PATENT DOCUMENTS

| | | | |
|---|---|---|---|
| EP | 3282343 | A1 | 2/2018 |
| EP | 3322159 | A1 | 5/2018 |
| WO | 2018/153165 | A1 | 8/2018 |

* cited by examiner

MOBILE TERMINAL, METHOD AND APPARATUS FOR CONTROLLING SCREEN, AND STORAGE MEDIUM

CROSS-REFERENCE TO RELATED APPLICATION

This application claims priority to Chinese Patent Application 201910319366.8 filed Apr. 19, 2019, the entire contents of which are incorporated herein by reference.

BACKGROUND

With the development of terminal technologies, flexible display screens have emerged. The flexible display screen is widely used due to its ability to bend and deform.

SUMMARY

The present disclosure relates generally to the field of terminal technologies, and more specifically to a mobile terminal, a method and apparatus for controlling a screen, and a storage medium.

Various embodiments of the present disclosure provides a mobile terminal, a method and apparatus for controlling a screen, and a storage medium.

In a first aspect, there is provided a mobile terminal, including a display screen, a support frame, a first side housing, a first reel and a first driving assembly, wherein the display screen is arranged on the support frame, and a first side portion of the display screen is made of a flexible material;

the first reel is arranged in a cavity in the first side housing, and the first side portion of the display screen circumferentially surrounds about the first reel; and the first driving assembly is connected to the first side housing through a first telescopic component.

In some embodiments, during an expansion process, the first driving assembly drives the first telescopic component to push the first side housing outwards, and the first side portion of the display screen expands about the first reel; and during a contraction process, the first driving assembly drives the first telescopic component to pull the first side housing inwards, and the first side portion of the display screen contracts about the first reel.

In some embodiments, a first comb plate is arranged on a side, connected to the first side housing, of the support frame;

a second comb plate which is adaptive to the first comb plate is arranged on a side, connected to the support frame, of the first side housing; and the first comb plate and the second comb plate are both attached to the back surface of the display screen.

In some embodiments, a recess portion is formed at the bottom of the first side housing; and a boss portion which is adaptive to the recess portion is formed at the bottom of a side, connected to the first side housing, of the support frame.

In some embodiments, a camera is arranged on the recess portion.

In some embodiments, the mobile terminal further includes a limiting mechanism; and the limiting mechanism is configured to limit a maximum displacement of the first side housing during the expansion of the first side portion of the display screen about the first reel.

In some embodiments, the mobile terminal further includes a second side housing, a second reel and a second driving assembly, wherein a second side portion of the display screen opposite the first side portion is made of a flexible material;

the second reel is arranged in a cavity in the second side housing, and the second side portion of the display screen circumferentially surrounds about the second reel; and the second driving assembly is connected to the second side housing through a second telescopic component.

In a second aspect, there is provided a method for controlling screen, which is applied to the mobile terminal according to the first aspect, wherein the method includes:

receiving a screen expansion instruction; and controlling, according to the screen expansion instruction, the first driving assembly to drive the first telescopic component to push the first side housing outwards, such that the first side portion of the display screen expands about the first reel.

In some embodiments, the method further includes:

receiving a screen contraction instruction; and controlling, according to the screen contraction instruction, the first driving assembly to drive the first telescopic component to pull the first side housing inwards, such that the first side portion of the display screen contracts about the first reel.

In a third aspect, there is provided an apparatus for controlling a screen, which is applied to the mobile terminal according to the first aspect, wherein the apparatus includes:

an expansion instruction receiving module configured to receive a screen expansion instruction; and a screen expansion module configured to control, according to the screen expansion instruction, the first driving assembly to drive the first telescopic component to push the first side housing outwards, such that the first side portion of the display screen expands about the first reel.

In some embodiments, the apparatus further includes:

a contraction instruction receiving module configured to receive a screen contraction instruction; and a screen contraction module configured to control, according to the screen contraction instruction, the first driving assembly to drive the first telescopic component to pull the first side housing inwards, such that the first side portion of the display screen contracts about the first reel.

In a fourth aspect, there is provided a non-transitory computer readable storage medium storing computer programs thereon, wherein the steps of the method according to the second aspect are implemented when the computer programs are executed by a processor.

It is to be understood that both the foregoing general description and the following detailed description are exemplary and illustrative only and are not intended to limit the present disclosure.

BRIEF DESCRIPTION OF THE DRAWINGS

The accompanying drawings, which are incorporated in and constitute a part of this disclosure, illustrate embodiments consistent with the present disclosure and, together with the description, serve to explain the principles of various embodiments of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of devices and methods consistent with aspects related to the disclosure as recited in the appended claims.

A flexible display screen can be a foldable screen. When a user wants to use a larger display screen, the user can expand the screen manually; and when the user wants to use the normal display screen, the user can fold the expanded screen back manually.

However, user's manual operations are required in the expansion and folding of the display screen, resulting in poor user experience.

In contrast, various embodiments of the present disclosure can have one or more of the following advantages.

For example, the driving assemblies are controlled to drive the telescopic components to push or pull the side housings by arranging the driving assemblies and the telescopic components inside the mobile terminal, such that the flexible display screen expands or contracts about the corresponding reel, thereby enabling automatic expansion or contraction of the flexible display screen, without manual operations by a user, thereby leading to improved user experience.

Figure 1:
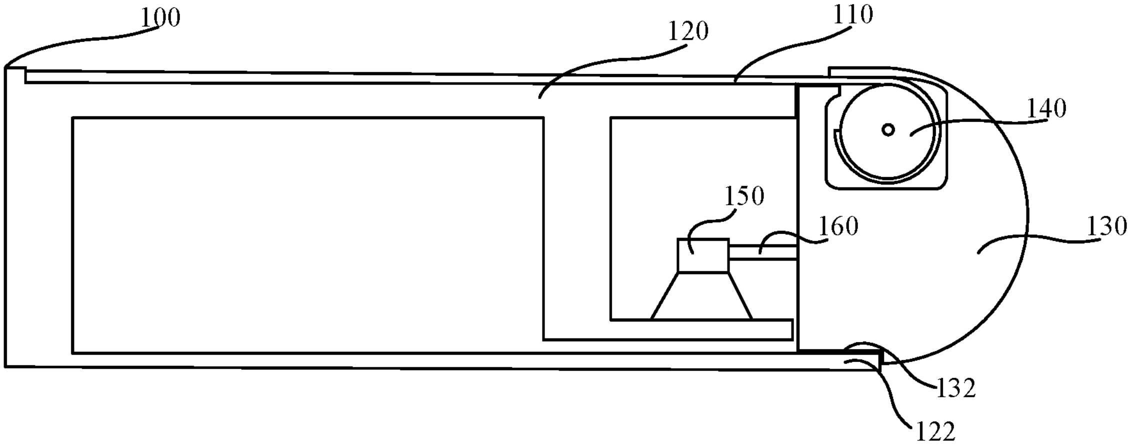
FIG. 1 is a schematic structural diagram of a mobile terminal shown according to some embodiments.
Figure 2:
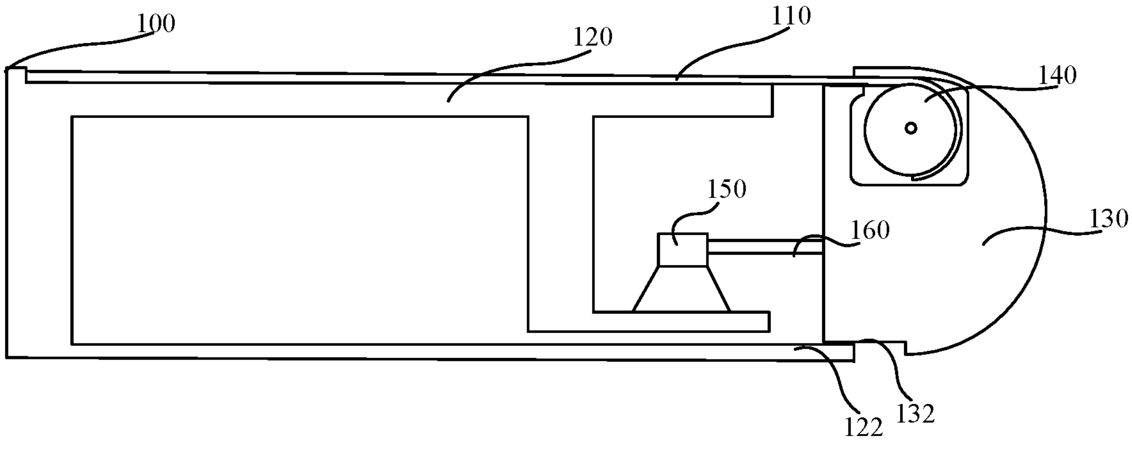
FIG. 2 is a schematic structural diagram of a mobile terminal shown according to some other embodiments.

FIG. 1 and FIG. 2 illustrate schematic structural diagrams of a mobile terminal. In FIG. 1, a display screen of the mobile terminal is in a contracted state. In FIG. 2, the display screen of the mobile terminal is in an expanded state. The mobile terminal 100 includes a display screen 110, a support frame 120, a first side housing 130, a first reel 140 and a first driving assembly 150.

The display screen 110 is arranged on the support frame 120, and a first side portion of the display screen 110 is made of a flexible material.

The display screen 110 is used to display images and colors. In some embodiments, the display screen 110 is a touch display screen. In addition to a display function, the touch display screen has a function of receiving a touch operation (such as clicking, sliding, pressing, etc.) of a user. In some embodiments, the display screen 110 can be an OLED (Organic Light-Emitting Diode) screen.

In some embodiments, the display screen 110 includes a first side portion and other portions. The first side portion can be made of a flexible material, and the other portions can be made of a flexible material or a rigid material. When the other portions are made of a flexible material, the display screen 110 functions as a complete flexible display screen. The flexible display screen refers to a display screen that can be bent and is flexible. The flexible display screen can change a screen form by bending, folding, and the like.

The support frame 120 is a main frame of the mobile terminal 100 and can also be referred to as a body. The support frame 120 is generally in a shape of a hexahedron, and a part of edges or corners of the hexahedron can be formed with a curved chamfer. The front surface of the support frame 120 is generally in a shape of a rounded rectangle or a rectangular rectangle. In this embodiment of the present disclosure, the support frame 120 can be used to support the display screen 110. A main chip and other main components can be accommodated inside the support frame 120 as well.

The first reel 140 is arranged in a cavity in the first side housing 130, and the first side portion of the display screen 110 circumferentially surrounds about the first reel 140.

An outer contour of the first side housing 130 can be U-shaped. A cavity is formed inside the first side housing 130 to accommodate the first reel 140. An opening is further formed in a position of the first side housing where the cavity is formed. The first side portion of the display screen 110 circumferentially surrounds about the first reel 140 via the opening.

In some embodiments, the end of the first side portion of the display screen 110 is fixed to the first reel 140. For example, the end of the first side portion of the display screen 110 can be fixed to the first reel 140 by gluing, or in a manner of plate-to-plate flattening. The manner of fixing the end of the first side portion of the display screen 110 to the first reel 140 will not be limited in embodiments of the present disclosure.

In order to prevent the surface of the display screen 110 from being damaged by the rubbing between the first side portion of the display screen 110 during the telescoping process and the sidewall of the cavity, a safety gap is reserved between the first side portion of the display screen 110 and the sidewall of the cavity to prevent the first side portion of the display screen 110 from rubbing with the sidewall of the cavity.

The first driving assembly 150 is connected to the first side housing 130 through a first telescopic component 160.

In some embodiments of the present disclosure, the first driving assembly 150 can convert electrical energy into mechanical energy, such that the first telescopic component 160 can push or pull the first side housing 130 to move. In some embodiments, the first driving assembly 150 is a motor.

The first telescopic component 160 refers to a telescopic component. For example, the first telescopic component 160 can be a connecting rod or other component having flexibility. The type of the first telescopic component will not be limited in embodiments of the present disclosure.

During the expansion process, the first driving component 150 drives the first telescopic component 160 to push the first side housing 130 outwards, and the first side portion of the display screen 110 expands about the first reel 140. The mobile terminal 100 changes from a state shown in FIG. 1 to a state shown in FIG. 2.

During the contraction process, the first driving component 150 drives the first telescopic component 160 to pull the first side housing 130 inwards, the first side portion of the display screen 110 contracts about the first reel 140. The mobile terminal 100 changes from a state shown in FIG. 2 to a state shown in FIG. 1.

By circumferentially surrounding the first side portion of the display screen 110 about the first reel 140, the first side portion of the display screen 110 has a self-contracting force. As such, the retraction of the first side portion can be aided by the self-contracting force.

During the expansion of the display screen 110, the first driving assembly 150 drives the first telescopic component 160 to push the first side housing 130 outwards, so that the first side housing 130 moves away from the support frame 120. When the first side housing 130 moves, the first reel 140 will be driven to rotate. In this case, the first side portion of the display screen 110 overcomes the self-contracting force to affect the expansion of the first side portion of the display screen 110. When the first side portion of the display screen 110 is in an expanded state, a display area of the mobile terminal 100 increases. According to the technical solution provided by this embodiment of the present disclosure, the screen display area of the mobile terminal 100 increases in the case where the mobile terminal 100 is convenient to carry.

During the contraction process of the display screen 110, the first driving assembly 150 drives the first telescopic component 160 to pull the first side housing 130 inwards, so that the first side housing 130 moves close to the support frame 120. When the first side housing 130 moves, the first reel 140 will be driven to rotate. In this case, the first side portion of the display screen 110 contracts by means of the self-contracting force.

Figure 3:
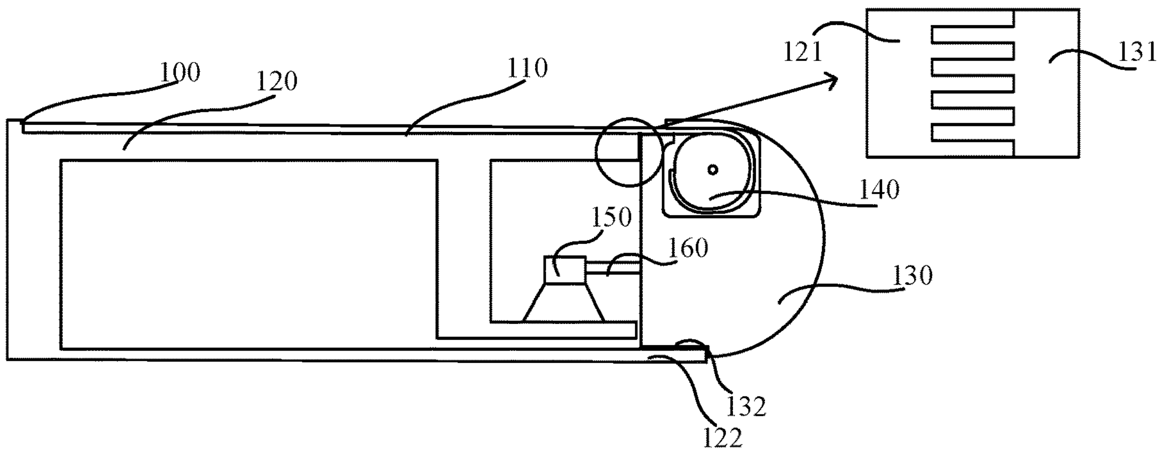
FIG. 3 is a schematic diagram illustrating a state of a first comb plate and a second comb plate.
Figure 4:
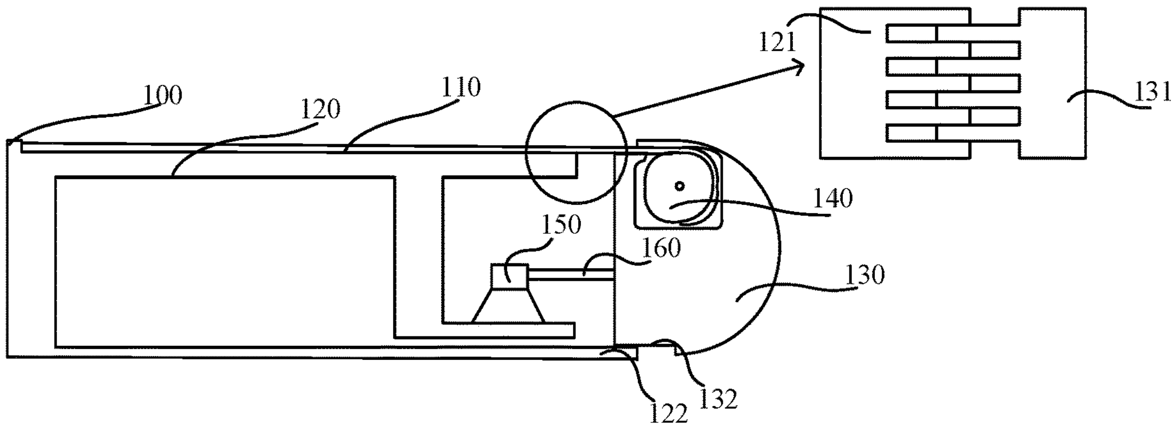
FIG. 4 is a schematic diagram illustrating a further state of the first comb plate and the second comb plate.

In some embodiments, as shown in FIG. 3 and FIG. 4, a first comb plate 121 is arranged on a side, connected to the first side housing 130, of the support frame 120. A second comb plate 131 which is adaptive to the first comb plate 121 is arranged on a side, connected to the support frame 120, of the first side housing 130. The first comb plate 121 and the second comb plate 131 are both attached to the back surface of the display screen 110.

The first comb plate 121 and the second comb plate 131 refer to a device having a comb tooth structure respectively. The first comb plate 121 and the second comb plate 131 each include a plurality of teeth. In some embodiments, the first comb plate 121 is the same as the second comb plate 131 in terms of any or all of the number of the teeth, the width of each tooth and the depth of each tooth groove.

When the first side portion of the display screen 110 is in the contracted state, a schematic diagram showing a state of the first comb plate 121 and the second comb plate 131 is as shown in FIG. 3. In this case, the teeth of the first comb plate 121 are completely meshed with the teeth of the second comb plate 131, and no tooth is exposed. When the first side portion of the display screen 110 is in the expanded state, a schematic diagram showing a state of the first comb plate 121 and the second comb plate 131 is as shown in FIG. 4. In this case, the teeth of the first comb plate 121 and the teeth of the second comb plate 131 are exposed. The first comb plate 121 and the second comb plate 131 can play a good supporting role for the display screen 110, thereby avoiding a phenomenon of an unlevel screen caused by disengagement of the support frame 120 from the first side housing 130.

In some embodiments, as shown in FIG. 1 and FIG. 2, a recess portion 132 is formed at the bottom of the first side housing 130. A boss portion 122 which is adaptive to the recess portion 132 is formed at the bottom of a side, connected to the first side housing 130, of the support frame 120.

In some embodiments, a camera is arranged on the recess portion 132. In the case of photographing, the first side housing 130 is pushed outwards, and the camera is exposed from the mobile terminal 100 to meet the user's photographing needs. By arranging the camera on the recess portion 132 at the bottom of the first side housing 130, the camera is not exposed at ordinary times and can thus be protected.

In some embodiments, the mobile terminal 100 further includes a limiting mechanism. The limiting mechanism is configured to limit a maximum displacement of the first side housing 130 during the expansion of the first side portion of the display screen 110 about the first reel 140. By means of the above manner, the screen is prevented from being stretched too much to cause damage caused by the excessive displacement of the first side housing 130.

The limiting mechanism can be a positioning pin, a positioning screw, a Hall assembly, etc., which will not be limited in this embodiment of the present disclosure.

In some exemplary embodiments, when the limiting mechanism is a positioning pin, a positioning screw or the like, the limiting mechanism can be arranged on the boss portion 122 of the support frame 120. Because the limiting mechanism functions to limit the first side housing 130, when the first side housing 130 moves to a position where the limiting mechanism is located, the first side housing 130 cannot continue to move away from the support frame 120. Further, the first side portion of the display screen 110 will stop expanding.

In some other embodiments, the limiting mechanism can include magnetic elements and a Hall sensor. The magnetic elements can include a permanent magnet element and a soft magnetic element. The Hall sensor is a magnetic field sensor fabricated according to the Hall effect. In an embodiment of the present disclosure, the Hall sensor can indirectly measure a displacement between the respective magnetic element and the Hall sensor, that is, a displacement between the support frame 120 and the first side housing 130.

In some embodiments, the magnetic elements are arranged on the support frame 120, and the Hall sensor is arranged on the first side housing 130; or the magnetic elements are arranged on the first side housing 130, and the Hall sensor is arranged on the support frame 120. When the displacement between the support frame 120 and the first side frame housing 130 is greater than a preset threshold, the mobile terminal controls the first driving assembly 150 to stop working, thereby causing the first side housing 130 to stop moving, and further causing the first side portion of the display screen 110 to stop expanding.

By arranging the limiting mechanism in the mobile terminal 100, the display screen 110 can be well protected from the damage caused by the excessive expansion of the display screen 110.

Of course, by setting the telescopic length of the first telescopic component 160, the limiting function of the limiting mechanism can also be achieved.

As such, in the technical solution provided by some embodiments of the present disclosure, the driving assemblies are controlled to drive the telescopic components to push or pull the side housings by arranging the driving assemblies and the telescopic components inside the mobile terminal, such that the flexible display screen expands or contracts about the corresponding reel, thereby enabling automatic expansion or contraction of the flexible display screen, without manual operations by a user, and the convenience is high.

In addition, a comb tooth structure is arranged on a side, connected to the corresponding side housing, of the support frame to support the flexible display screen better, thereby protecting the flexible display screen.

Moreover, by arranging the camera on the recess portion at the bottom of the first side housing, the camera is not exposed at ordinary times and can thus be protected.

In some embodiments, the camera is hidden when the first side portion is retracted, and becomes exposed and ready for image capturing when the first side portion is in the expanded state.

Figure 5:
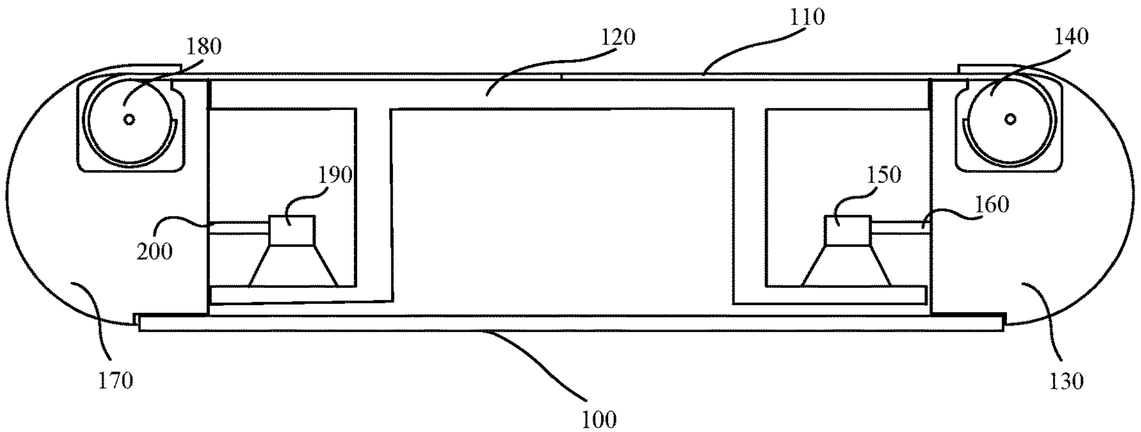
FIG. 5. is a schematic structural diagram of a mobile terminal shown according to some other embodiments.

FIG. 5 is a schematic structural diagram of a mobile terminal shown according to some other embodiments. The mobile terminal 100 includes a display screen 110, a support frame 120, a first side housing 130, a first reel 140, a first driving assembly 150, a second side housing 170, a second reel 180, and a second driving assembly 190.

The description of the display screen 110, the support frame 120, the first side housing 130, the first reel 140, and the first driving assembly 150 can refer to the above embodiments, and will not be described herein again.

A second side portion of the display screen 110 opposite the first side portion is made of a flexible material, i.e., the second side portion of the display screen 110 is a flexible display screen.

For example, the display screen 110 includes a first side portion, a second side portion, and an intermediate portion. The first side portion and the second side portion are made of a flexible material. The intermediate portion can be made of a flexible material or a rigid material. When the intermediate portion is made of a flexible material, the display screen 110 is a complete flexible display screen.

The second reel 180 is arranged in a cavity inside the second side housing 170, and the second side portion of the display screen 110 circumferentially surrounds about the second reel 180.

An outer contour of the second side housing 170 can be U-shaped. A cavity is formed inside the second side housing 170 to accommodate the second reel 180. An opening is further formed in a position of the second side housing 170 where the cavity is formed. The second side portion of the display screen 110 circumferentially surrounds about the second reel 180 via the opening.

In some embodiments, the end of the second side portion of the display screen 110 is fixed to the second reel 180. For example, the end of the second side portion of the display screen 110 can be fixed to the second reel 180 by gluing, or in a manner of plate-to-plate flattening. The manner of fixing the end of the second side portion of the display screen 110 to the second reel 180 will not be limited in this embodiment of the present disclosure.

In order to prevent the surface of the display screen 110 from being damaged by the rubbing between the second side portion of the display screen 110 during the telescoping process and the sidewall of the cavity, a safety gap is reserved between the second side portion of the display screen 110 and the sidewall of the cavity to prevent the second side portion of the display screen 110 from rubbing with the sidewall of the cavity.

The second driving assembly 190 is connected to the second side housing 170 through a second telescopic component 200.

In an embodiment of the present disclosure, the second driving assembly 190 can convert electrical energy into mechanical energy, such that the second telescopic component 200 can push or pull the second side housing 170 to move. In some embodiments, the second driving assembly 190 is a motor.

The second telescopic component 200 refers to a telescopic component. For example, the second telescopic component 200 can be a connecting rod or other component having flexibility. The type of the second telescopic component 200 will not be limited in this embodiment of the present disclosure.

During the expansion process, the second driving assembly 190 drives the second telescopic component 200 to push the second side housing 170 outwards, and the second side portion of the display screen 110 expands about the second reel 180.

During the contraction process, the second driving assembly 190 drives the second telescopic component 200 to pull the second side housing 170 inwards, and the second side portion of the display screen 110 contracts about the second reel 180.

The description of the expansion process and the contraction process of the second side portion of the display screen 110 can refer to an introduction to the expansion process and the contraction process of the first side portion of the display screen 110, and will not be described herein.

In some embodiments, a third comb plate is arranged on a side, connected to the second side housing 170, of the support frame 120. A fourth comb plate which is adaptive to the third comb plate is arranged on a side, connected to the support frame 120, of the second side housing 170. The third comb plate and the fourth comb plate are both attached to the back surface of the display screen 110.

The description of the third comb plate and the fourth comb plate can refer to the introduction to the first comb plate and the second comb plate, and will not be described herein again.

The first side portion and the second side portion of the display screen 110 can be simultaneously expanded, and a display area is maximum at this time. Of course, the first side portion of the display screen 110 can be expanded, and the second side portion can be contracted; or the first side portion of the display screen 110 can be contracted, and the second side portion can be expanded. The expansion or contraction of the display screen 110 is determined by user's display requirements. When the user wants the largest display area, the first side portion and the second side can be simultaneously expanded. In the technical solutions provided by this embodiment of the present disclosure, the display forms are diversified.

As such, in the technical solution provided by some embodiments of the present disclosure, by arranging the driving assemblies on both sides and the telescopic components, the display area increases, and the display forms are diversified, such that the user's display requirements can be satisfied better.

Figure 6:
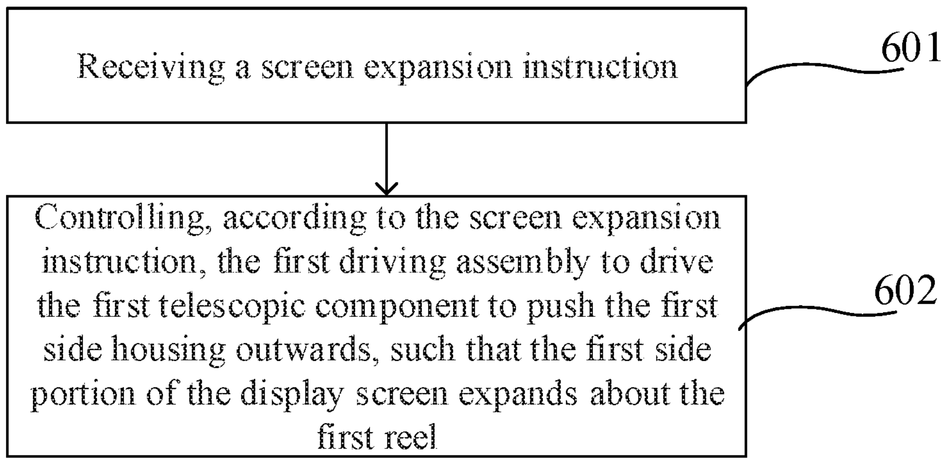
FIG. 6 is a flowchart of a screen control method shown according to some embodiments.

FIG. 6 is a flowchart of a screen control method shown according to some embodiments, which is applied to the mobile terminal as described above. An executive body of the method can be the mobile terminal as described above. The method includes the following steps (steps 601-602).

In step 601, a screen expansion instruction is received.

The screen expansion instruction is an operation instruction for expanding the display screen. The screen expansion instruction can be triggered by a system interaction button in the display screen, or by a physical or touch key provided on the mobile terminal. Of course, in other possible implementations, the screen expansion instruction can also be triggered by user's voice and gesture. The triggering manner of the screen expansion instruction will not be limited in this embodiment of the present disclosure.

In step 602, the first driving assembly is controlled according to the screen expansion instruction to drive the first telescopic component to push the first side housing outwards, so that the first side portion of the display screen expands about the first reel.

The first driving assembly drives the first telescopic component to push the first side housing outwards, such that the first side housing moves away from the support frame. When the first side housing moves, the first reel is driven to rotate. In this case, the first side portion of the display screen overcomes the self-contracting force to affect the expansion of the first side portion of the display screen.

For example, when a user wants to view a video using a larger display area, the user can click on a system button on the display screen to trigger a screen expansion instruction. After the mobile terminal receives the screen expansion instruction, the first side portion of the display screen is expanded, and the mobile terminal provides a larger display area for the user to view the video.

Figure 7:
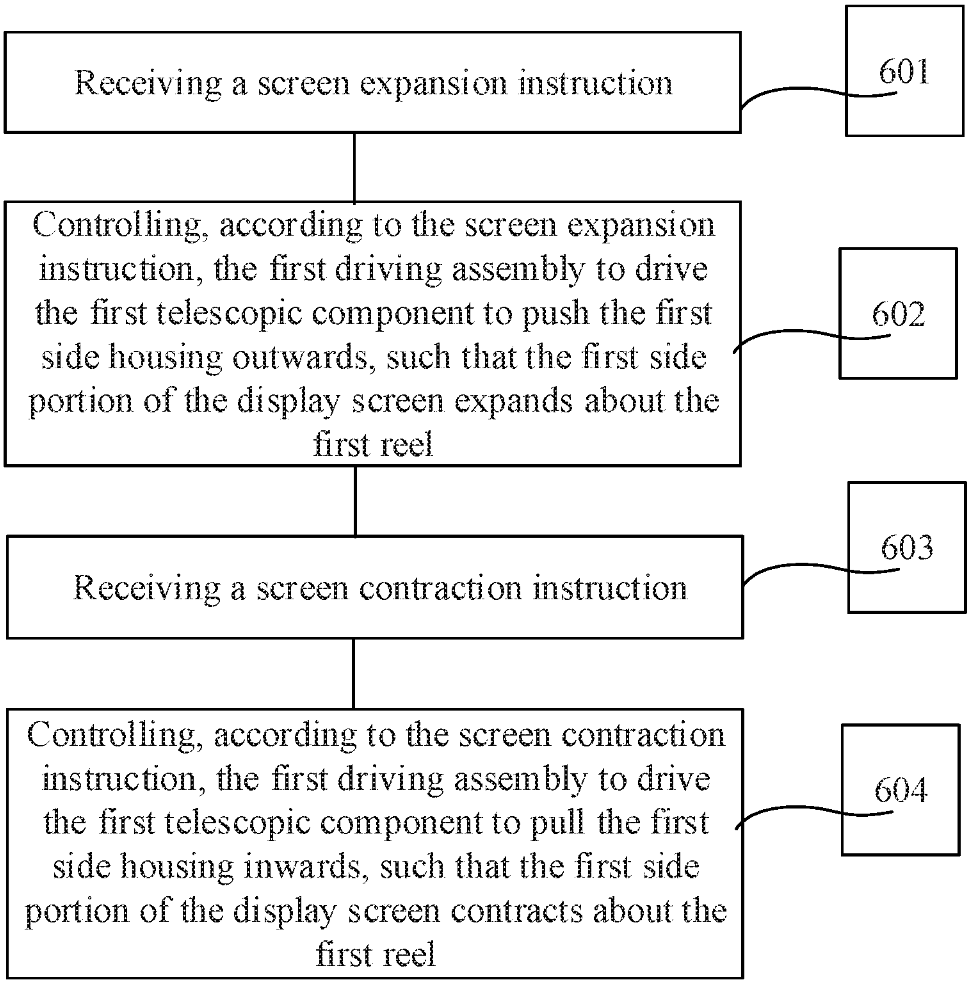
FIG. 7 is a flowchart of a screen control method shown according to some other embodiments.

In some embodiments, as shown in FIG. 7, the method further includes the following steps (steps 603-604).

In step 603, a screen contraction instruction is received.

The screen contraction instruction is an operation instruction for contracting the display screen. The screen contraction instruction can be triggered by a system interaction button in the display screen, or by a physical or touch key provided on the mobile terminal. Of course, in other possible implementations, the screen contraction instruction can also be triggered by user's voice and gesture. The triggering manner of the screen contraction instruction will not be limited in this embodiment of the present disclosure.

In step 604, the first driving assembly is controlled according to the screen contraction instruction to drive the first telescopic component to pull the first side housing inwards, so that the first side portion of the display screen contracts about the first reel.

The first driving assembly drives the first telescopic component to pull the first side housing inwards, such that the first side housing moves close to the support frame. When the first side housing moves, the first reel is driven to rotate. In this case, the first side portion of the display screen contracts by means of the self-contracting force.

For example, after the user finishes viewing the video, the user does not need a larger display area, and the user will click a system button on the display screen again to trigger the screen contraction instruction. After the mobile terminal receives the screen contraction instruction, the first side portion of the display screen contracts, and the display area of the mobile terminal returns to normal.

FIG. 6 and FIG. 7 make illustrations by merely expanding or contracting the first side portion of the display screen. The expansion process or the contraction process of the second side portion is similar to the expansion process or the contraction process of the first side portion, and will not be described herein.

As such, in the technical solution provided by some embodiments of the present disclosure, the driving assemblies are controlled to drive the telescopic components to push or pull the side housings by arranging the driving assemblies and the telescopic components inside the mobile terminal, such that the flexible display screen expands or contracts about the corresponding reel, thereby enabling automatic expansion or contraction of the flexible display screen, without manual operations by a user, and the convenience is high.

The following is an apparatus embodiment of the present disclosure, which can be used to implement the method embodiments of the present disclosure described above. For details not disclosed in the apparatus embodiment of the present disclosure, the method embodiments of the present disclosure can be referred to.

Figure 8:
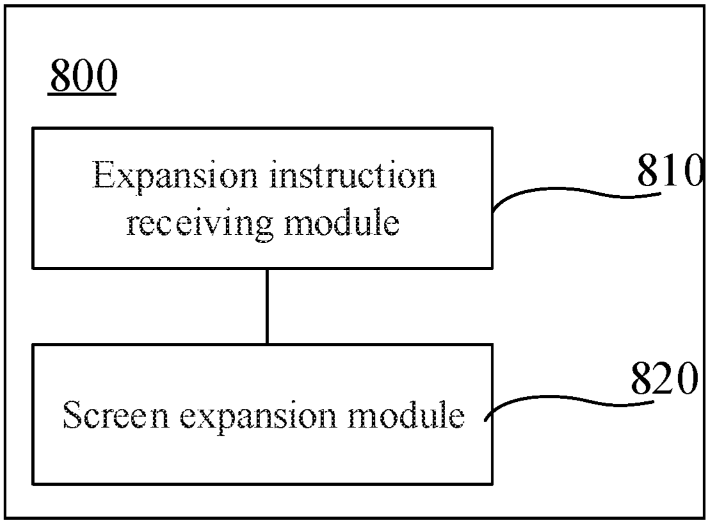
FIG. 8 is a block diagram of a screen control apparatus shown according to some embodiments.

FIG. 8 is a block diagram of a screen control apparatus shown according to some embodiments. The apparatus is applied to the mobile terminal as described above, which can be the mobile terminal as described above or can be arranged in the mobile terminal. The apparatus has a function of implementing the foregoing method embodiment, and the function can be implemented by hardware, or by performing corresponding software with hardware. The apparatus 800 can include an expansion instruction receiving module 810 and a screen expansion module 820.

The expansion instruction receiving module 810 is configured to receive a screen expansion instruction.

The screen expansion module 820 is configured to control, according to the screen expansion instruction, the first driving assembly to drive the first telescopic component to push the first side housing outwards, such that the first side portion of the display screen expands about the first reel.

As such, in the technical solution provided by some embodiments of the present disclosure, the driving assemblies are controlled to drive the telescopic components to push or pull the side housings by arranging the driving assemblies and the telescopic components inside the mobile terminal, such that the flexible display screen expands or contracts about the corresponding reel, thereby enabling automatic expansion or contraction of the flexible display screen, without manual operations by a user, and the convenience is high.

Figure 9:
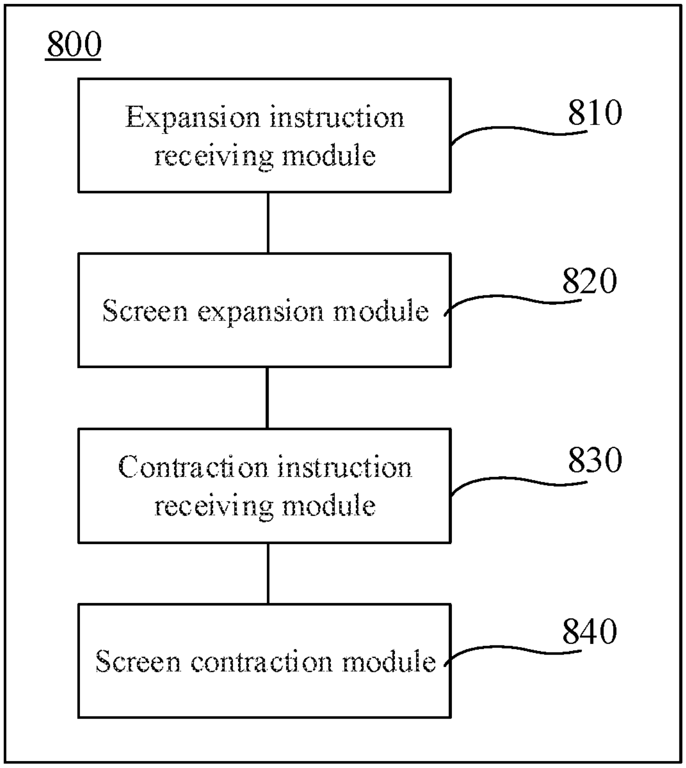
FIG. 9 is a block diagram of a screen control apparatus shown according to some other embodiments.

In some embodiments, as shown in FIG. 9, the apparatus 800 further includes a contraction instruction receiving module 830 and a screen contraction module 840.

The contraction instruction receiving module 830 is configured to receive a screen contraction instruction.

The screen contraction module 840 is configured to control, according to the screen contraction instruction, the first driving assembly to drive the first telescopic component to pull the first side housing inwards, such that the first side portion of the display screen contracts about the first reel.

It should be noted that when achieving the functions by the apparatus provided by the above embodiment, examples are given by illustrating the division of the individual functional modules. In actual applications, the above functions can be allocated by different functional modules according to actual needs; that is, the internal structure of the device can be divided into different functional modules to realize all or part of the above-described functions.

With regard to the apparatus in the above embodiments, the specific manner in which the respective modules perform the operations has been described in detail in the embodiment relating to the method, and will not be explained in detail herein.

Figure 10:
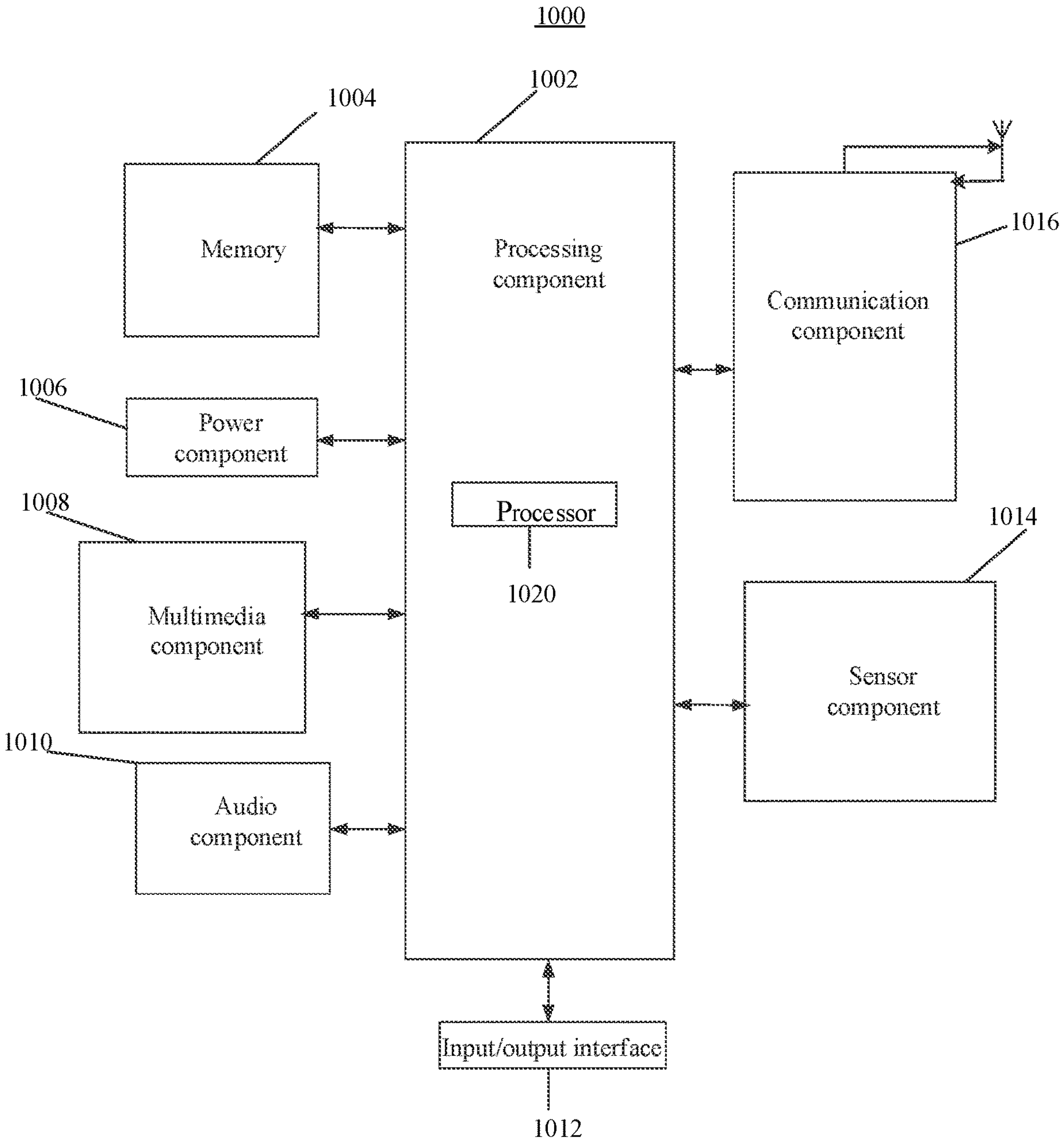
FIG. 10. is a block diagram of a screen control apparatus according to some other embodiments.

FIG. 10 is a block diagram of a screen control apparatus 1000 in accordance with some embodiments. For example, the apparatus 1000 can be a mobile terminal such as a mobile phone, a personal digital assistant, a tablet computer, a personal computer, and the like Referring to FIG. 10, the apparatus 1000 can include one or more of the following components: a processing component or circuit 1002, a memory device 1004, a power component 1006, a multimedia component 1008, an audio component 1010, an input/output (I/O) interface 1012, a sensor component 1014, and a communication component 716.

The processing component 1002 typically controls the overall operations of the apparatus 1000, such as the operations associated with display, telephone calls, data communications, camera operations, and recording operations. The processing component 1002 can include one or more processors 1020 to execute instructions to perform all or part of the steps in the above described methods. Moreover, the processing component 1002 can include one or more modules which facilitate the interaction between the processing component 1002 and other components. For instance, the processing component 1002 can include a multimedia module to facilitate the interaction between the multimedia component 1008 and the processing component 1002.

The memory device 1004 is configured to store various types of data to support the operation of the apparatus 1000. Examples of such data include instructions for any applications or methods operated on the apparatus 1000, contact data, phonebook data, messages, pictures, videos, etc. The memory 1004 can be implemented by using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1006 provides power to various components of the apparatus 1000. The power component 1006 can include a power management system, one or more power sources, and any other components associated with the generation, management, and distribution of power in the apparatus 1000.

The multimedia component 1008 includes a screen providing an output interface between the apparatus 1000 and the user. In some embodiments, the screen can include a liquid crystal display (LCD) and a touch panel (TP). In some embodiments, the screen can include an OLED screen, or other types of displays.

If the screen includes the touch panel, the screen can be implemented as a touch screen to receive input signals from the user. The touch panel includes one or more touch sensors to sense touches, swipes, and gestures on the touch panel. The touch sensors can not only sense a boundary of a touch or swipe action, but also sense the duration and pressure associated with the touch or swipe action. In some embodiments, the multimedia component 1008 includes a front camera and/or a rear camera. The front camera and the rear camera can receive external multimedia data while the apparatus 1000 is in an operation mode, such as a photographing mode or a video mode. Each of the front camera and the rear camera can be a fixed optical lens system or have focus and optical zoom capability.

The audio component 1010 is configured to output and/or input audio signals. For example, the audio component 1010 includes a microphone (MIC) configured to receive external audio signals when the apparatus 1000 is in an operation mode, such as a call mode, a recording mode, and a voice recognition mode. The received audio signal can be further stored in the memory 1004 or transmitted via the communication component 1017. In some embodiments, the audio component 1010 further includes a speaker for outputting audio signals.

The I/O interface 1012 provides an interface between the processing component 1 and peripheral interface modules, such as a keyboard, a click wheel, buttons, and the like. The buttons can include, but are not limited to, a home button, a volume button, a start button, and a lock button.

The sensor component 1014 includes one or more sensors to provide status assessments of various aspects of the apparatus 1000 For instance, the sensor component 714 can detect an on/off status of the apparatus 1000, relative positioning of components, e.g., the display device and the mini keyboard of the apparatus 1000, and the sensor component 1014 can also detect a position change of the apparatus 1000 or a component of the apparatus 1000, presence or absence of user contact with the apparatus 1000, orientation or acceleration/deceleration of the apparatus 1000, and temperature change of the apparatus 1000. The sensor component 1014 can include a proximity sensor configured to detect the presence of nearby objects without any physical contact. The sensor component 1014 can also include a light sensor, such as a CMOS or CCD image sensor, used for imaging applications. In some embodiments, the sensor component 1014 can also include an accelerometer sensor, a gyroscope sensor, a magnetic sensor, a pressure sensor, or a temperature sensor.

The communication component 1016 is configured to facilitate communication, wired or wirelessly, between the apparatus 1000 and other devices. The apparatus 1000 can access a wireless network based on a communication standard, such as Wi-Fi, 2G, 3G, 4G, or 5G, or a combination thereof. In some embodiments, the communication component 1016 receives broadcast signals or broadcast associated information from an external broadcast management system via a broadcast channel. In some embodiments, the communication component 1016 further includes a near field communication (NFC) module to facilitate short-range communications. For example, the NFC module can be implemented based on a radio frequency identification (RFID) technology, an infrared data association (IrDA) technology, an ultra-wideband (UWB) technology, a Bluetooth (BT) technology, and other technologies.

In exemplary embodiments, the apparatus 1000 can be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In some embodiments, there is further provided a non-transitory computer readable storage medium storing computer programs thereon, wherein the computer programs can be executed by a processor 1020 of the apparatus 1000 to complete the screen control method.

For example, the non-transitory computer readable storage medium can be a ROM, a random-access memory (RAM), a CD-ROM, a magnetic tape, a floppy disk, an optical data storage device, or the like.

Understandably, the term "plurality" herein refers to two or more. "And/or" herein describes the correspondence of the corresponding objects, indicating three kinds of relationship. For example, A and/or B, can be expressed as: A exists alone, A and B exist concurrently, B exists alone. The character "/" generally indicates that the context object is an "OR" relationship.

The operations described in this disclosure can be implemented as operations performed by a data processing apparatus on data stored on one or more computer-readable storage devices or received from other sources.

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized. Some other embodiments of the present disclosure can be available to those skilled in the art upon consideration of the specification and practice of the various embodiments disclosed herein.

The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims. In the present disclosure, it is to be understood that the terms "bottom," "inside," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

It will be understood that when an element such as a layer, region, or other structure is referred to as being "on" or extending "onto" another element, it can be directly on or extend directly onto the other element or intervening elements can also be present. In contrast, when an element is referred to as being "directly on" or extending "directly onto" another element, there are no intervening elements present.

Likewise, it will be understood that when an element such as a layer, region, or substrate is referred to as being "over" or extending "over" another element, it can be directly over or extend directly over the other element or intervening elements can also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements can be present. In contrast, when an element is referred to as being "directly connected" or "directly coupled" to another element, there are no intervening elements present.

Relative terms such as "below" or "above" or "upper" or "lower" or "vertical" or "horizontal" can be used herein to describe a relationship of one element, layer, or region to another element, layer, or region as illustrated in the drawings. It will be understood that these terms and those discussed above are intended to encompass different orientations of the device in addition to the orientation depicted in the drawings.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In the description of the present disclosure, the terms "some embodiments," "example," and the like may indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described may be combined in a suitable manner in any one or more embodiments or examples. In addition, various embodiments or examples described in the specification, as well as features of various embodiments or examples, may be combined and reorganized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

The invention claimed is:

1. A mobile terminal, comprising a display screen, a support frame, a first side housing, a first reel, and a first driving assembly, wherein the display screen is arranged on the support frame, and a first side portion of the display screen is made of a flexible material;

the first reel is arranged in a cavity in the first side housing, and the first side portion of the display screen is configured circumferentially about the first reel; and the first driving assembly is coupled to the first side housing through a first telescopic component;

wherein a recess portion is formed at a bottom of the first side housing; and a boss portion which is adaptive to the recess portion is formed at a bottom of a side, connected to the first side housing, of the support frame.

2. The mobile terminal according to claim 1, wherein during an expansion process, the first driving assembly drives the first telescopic component to push the first side housing outwards, and the first side portion of the display screen expands about the first reel; and during a contraction process, the first driving assembly drives the first telescopic component to pull the first side housing inwards, and the first side portion of the display screen contracts about the first reel.

3. The mobile terminal according to claim 1, wherein a camera is arranged at the recess portion.

4. The mobile terminal according to claim 1, further comprising a limiting mechanism; wherein the limiting mechanism is configured to limit a maximum displacement of the first side housing during an expansion of the first side portion of the display screen about the first reel.

5. A method for controlling a screen applied to the mobile terminal according to claim 1, wherein the method comprises:

receiving a screen expansion instruction; and controlling, according to the screen expansion instruction, the first driving assembly to drive the first telescopic component to push the first side housing outwards, such that the first side portion of the display screen expands about the first reel.

6. The method according to claim 5, further comprising:

receiving a screen contraction instruction; and controlling, according to the screen contraction instruction, the first driving assembly to drive the first telescopic component to pull the first side housing inwards, such that the first side portion of the display screen contracts about the first reel.

7. The method according to claim 5, wherein during an expansion process, the first driving assembly drives the first telescopic component to push the first side housing outwards, and the first side portion of the display screen expands about the first reel; and during a contraction process, the first driving assembly drives the first telescopic component to pull the first side housing inwards, and the first side portion of the display screen contracts about the first reel.

8. The method according to claim 5, wherein a first comb plate is arranged on a side, connected to the first side housing, of the support frame;

a second comb plate which is adaptive to the first comb plate is arranged on a side, connected to the support frame, of the first side housing; and the first comb plate and the second comb plate are both attached to the back surface of the display screen.

9. The method according to claim 5, wherein the mobile terminal further comprises a limiting mechanism; and the limiting mechanism is configured to limit a maximum displacement of the first side housing during an expansion of the first side portion of the display screen about the first reel.

10. The method according to claim 5, wherein the mobile terminal further comprises a second side housing, a second reel and a second driving assembly, wherein a second side portion of the display screen opposite the first side portion is made of a flexible material;

the second reel is arranged in a cavity in the second side housing, and the second side portion of the display screen circumferentially surrounds about the second reel; and the second driving assembly is connected to the second side housing through a second telescopic component.

11. A non-transitory computer-readable storage medium storing instruction thereon for execution by a processing circuit to realize the method according to claim 5.

12. The non-transitory computer-readable storage medium according to claim 11, wherein the instructions are further executed by a processor to:

receive a screen contraction instruction; and control, according to the screen contraction instruction, the first driving assembly to drive the first telescopic component to pull the first side housing inwards, such that the first side portion of the display screen contracts about the first reel.

13. A mobile terminal, comprising a display screen, a support frame, a first side housing, a first reel, and a first driving assembly, wherein the display screen is arranged on the support frame, and a first side portion of the display screen is made of a flexible material;

the first reel is arranged in a cavity in the first side housing, and the first side portion of the display screen is configured circumferentially about the first reel; and the first driving assembly is coupled to the first side housing through a first telescopic component;

the mobile terminal further comprising a second side housing, a second reel and a second driving assembly, wherein a second side portion of the display screen opposite the first side portion is made of a flexible material;

the second reel is arranged in a cavity in the second side housing, and the second side portion of the display screen circumferentially surrounds about the second reel; and the second driving assembly is connected to the second side housing through a second telescopic component.

14. The mobile terminal according to claim 13, wherein the mobile terminal is a mobile phone or a tablet computer.

15. The mobile terminal according to claim 14, wherein the display screen comprises an organic light-emitting diode (OLED) screen.

16. The mobile terminal according to claim 15, further comprising a microphone and a camera, wherein the first side portion of the display screen is configured to have self-contracting force to aid retraction, and wherein the camera is configured to become hidden after the retraction.

17. A mobile terminal, comprising a display screen, a support frame, a first side housing, a first reel, and a first driving assembly, wherein the display screen is arranged on the support frame, and a first side portion of the display screen is made of a flexible material;

the first reel is arranged in a cavity in the first side housing, and the first side portion of the display screen is configured circumferentially about the first reel; and the first driving assembly is coupled to the first side housing through a first telescopic component;

wherein a first comb plate is arranged on a side, connected to the first side housing, of the support frame;

a second comb plate which is adaptive to the first comb plate is arranged on a side, connected to the support frame, of the first side housing; and the first comb plate and the second comb plate are both attached to the back surface of the display screen.

18. A method for controlling a screen applied to a mobile terminal comprising a display screen, a support frame, a first side housing, a first reel, and a first driving assembly, wherein the display screen is arranged on the support frame, and a first side portion of the display screen is made of a flexible material;

the first reel is arranged in a cavity in the first side housing, and the first side portion of the display screen is configured circumferentially about the first reel; and the first driving assembly is coupled to the first side housing through a first telescopic component, a recess portion is formed at a bottom of the first side housing;

wherein the method comprises:

receiving a screen expansion instruction; and controlling, according to the screen expansion instruction, the first driving assembly to drive the first telescopic component to push the first side housing outwards, such that the first side portion of the display screen expands about the first reel;

wherein a camera is arranged on the recess portion.

* * * * *